May 5, 1959  H. O. DOBRICK  2,885,173
AUTOMATIC PRESSURE OPERATED VALVE
Filed April 22, 1954
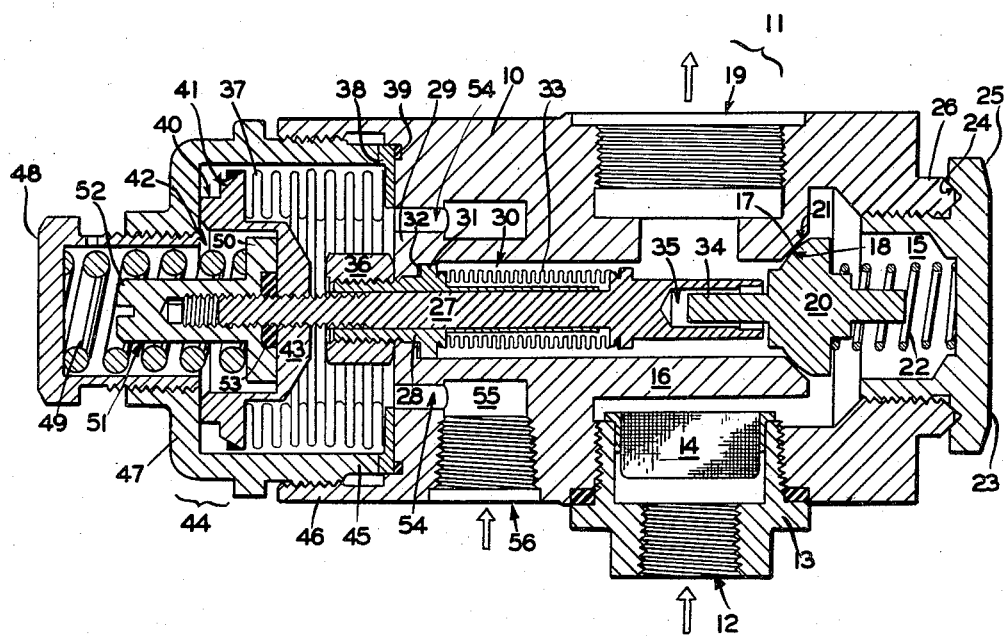
INVENTOR.
HERBERT O. DOBRICK
BY
ATTORNEY

United States Patent Office 2,885,173
Patented May 5, 1959

2,885,173

AUTOMATIC PRESSURE OPERATED VALVE

Herbert O. Dobrick, Maywood, N.J., assignor to Bendix Aviation Corporation, Teterboro, N.J., a corporation of Delaware Application April 22, 1954, Serial No. 424,959

2 Claims. (Cl. 251—61)

This invention relates to valves, and particularly to valves of the type operated by fluid pressure to open and close a fluid passage.

An object of the invention is to provide a valve of this type that will reduce the tendency of obstructions such as ice and dirt to interfere with effective operation.

Another object is to provide an improved bellows arrangement for operating the valve. A specific purpose is to provide a novel construction of the bellows and an associated spring.

A further object is to provide new adjusting arrangements, including an adjustment of valve clearance and an adjustment of bellows valve-operating pressure.

An additional object is to provide a novel construction of associated spring and bellows, and particularly a compact and efficient arrangement of these elements.

Another object is to provide an improved conical seal for a screw cap or the like.

A further purpose is to attain any or all of these objects in a compact, strong and effective unit.

The invention is especially suitable for use in systems where oxygen, gasified from the liquid form, is supplied under pressure to containers or to utilization apparatus which provides a supply for breathing by high-flying aviators or for other purposes. It is applicable to valves which cut off the supply when the pressure reaches a selected limit. An object of the invention is to provide a novel valve that will operate effectively for this purpose.

These and other objects and advantages of the invention will appear more fully from consideration of the detailed description which follows, taken in conjunction with the accompanying drawing, wherein one embodiment of the invention is illustrated by way of example. It is to be expressly understood, however, that the drawing is for the purposes of illustration and description only, and is not intended as a definition of the limits of the invention.

The drawing is a longitudinal cross section through a valve embodying the invention.

The illustrated embodiment comprises a valve body 10 having adjacent to one end a transverse passage 11 for gas under pressure. The passage comprises an inlet 12 at one side, which may be threaded to receive a filter holder 13, tapped to receive an inlet pipe and carrying a ceramic filter 14. Inlet 12 connects with an end chamber 15 connected to the interior of a cylindrical wall 16 through a valve seat 17 formed with a conical face 18. The interior of wall 16 communicates with outlet 19, threaded to receive an outlet pipe.

A valve head 20 is located in chamber 15, and bears against seat 17 to close the transverse passage 11. In the form shown, head 20 comprises a seating face 21 of spherical contour proportioned to contact an intermediate portion of seat face 18. A spiral compression spring 22 bears against the outer face of head 20 and the inner face of cap 23, which is threaded into the end of chamber 15 in sealing engagement with the adjacent part of body 10. As shown, the seal comprises an annular V-shaped groove 24 in the flange 25 of cap 23, into which the edge of a similarly shaped annular ridge 26 on the end of the body 10 is fitted, so that upon screwing cap 23 tightly into the body, the sides of flange 25 engage the walls of groove 24. Since the inner and outer faces of ridge 26 and groove 24 are conical, it is unnecessary to form them to the close tolerances required for a gastight metal-to-metal seal, since either the inner faces or the outer faces will register accurately and provide the required seal.

An arrangement is provided for lifting the valve head 20 off of seat 17 against the pressure of spring 22 to open the valve. As shown, this comprises a stem 27 slidably mounted in a sleeve 28 extending through a transverse partition 29 in body 10 and sealed to said body. In the form illustrated, a well 30 extending in alignment with the inner face of cylindrical wall 16 to partition 29 accommodates a flange 31 on sleeve 28 bearing against the partition 29 through a sealing washer or coating 32. The joint between valve stem 27 and sleeve 28 is suitably sealed, as by bellows 33 surrounding and sealed at its ends to the sleeve and stem respectively.

The valve end of stem 27 is arranged to move endwise into and out of abutting contact with valve head 20, and preferably is provided with a sliding connection with said head. In the form illustrated this includes a cylindrical stud 34 axially positioned on the inner face of head 20 and slidable in a cylindrical bore 35 in the end of stem 27. Sufficient clearance is provided to avoid any tendency for ice or other foreign matter to clog the joint, while maintaining the head 20 in sufficiently accurate axial orientation with seat 17 to assure proper tight seating engagement between the face 21 of the head and face 18 of the seat 17, the spherical form of face 21 permitting a loose connection and resultant possible tilting of head 20 without affecting proper seating.

An arrangement is provided on the outer side of partition 29 for holding sleeve flange 31 against the partition. As shown, the end of the sleeve projecting beyond the partition is threaded to receive a nut 36 bearing against the outer partition face. Extending from said face there is provided a combined spring and bellows arrangement bearing against the stem 27, the spring serving to bias the stem against the valve head 20 to open the valve, while the bellows under sufficient pressure counteracts the spring action and retracts the stem to allow the valve to close. In the illustrated embodiment the inner margin of bellows 37 is sealed to a bellows plate 38 resting against the partition 29 and sealed against leakage thereon by a gasket 39. A drive head 40 comprises a marginal flange 41 to which the other end of bellows 37 is sealed, and a central recess 42 ending in a central boss 43 through which stem 27 is threaded. A bellows casing 44 is provided with a cylindrical skirt 45 threaded into a cylindrical flange 46 on body 10 and bearing against the margin of bellows plate 38 and gasket 39, serving to maintain the plate in tight sealed relationship to partition 29. Casing 44 is provided with an inturned flange 47 threaded to receive a cylindrical spring cap 48. A spiral compression spring 49 fitting within and bearing against the end of cap 48 engages at its opposite end the lateral flange 50 of spring holder 51, which is provided with a central stud 52 internally threaded to receive the end of stem 27. Spring holder 51 is screwed down into contact with boss 43 of drive head 40, and is provided with a packing 53 fitting tightly against said boss and stem 27 to prevent leakage from the interior of bellows 37. Said interior is connected through axial passages 54 to annular chamber 55 provided with a threaded inlet 56 for pressure gas.

In operation, in the absence of gas pressure in bellows 37, spring 49 forces the drive head boss 43 into contact with nut 36, the end of stem 27 contacting valve head 20 and holding it off of seat 17, compressing spring 22, so that the valve is open. Upon the introduction of gas under pressure through inlet 56 into the interior of bellows 37, the bellows expands, forcing drive head 40 outwardly against the compression of spring 49 and retracting stem 27. When the proper pressure is developed in said bellows, flange 41 of the drive head will be forced against the casing flange 47, and the end of stem 27 will be pulled away from valve head 20, which is seated by spring 22. During operation the filter 14 prevents the introduction with the gas of particles that might interfere with the seating of the valve, and shielding bellows 33 eliminates both any leakage between stem 27 and sleeve 28, and any interference with the free movement of the stem in said sleeve by the formation of ice from moisture in the gas, which may occur especially when the valve is used on aircraft flying in low temperatures, or by the temperature of the gas in passage 11.

The proper open position of the valve head 20 can be adjusted by releasing the pressure on bellows plate 38 by backing off the casing 44 and rotating the drive head 40, together with spring holder 51, bellows 37 and plate 38, thereby changing the position of boss 43 on stem 27. Spring holder 51 is then tightened on the stem, serving as a lock nut. The gas pressure at which bellows 37 will overcome spring 49 and allow the valve to close can also be adjusted by rotating spring cap 48 to adjust the pressure of said spring on the drive head 40.

With the described arrangement, the pressure at which the valve closes is not dependent upon the pressure of the gas passing through the valve; and the valve will operate effectively if both the passage inlet 12 and the pressure inlet 56 are connected to the same source. The construction is particularly effective for the regulation of the flow of gaseous oxygen to supply systems of the type used to furnish oxygen for aviators flying at high altitudes, or to fill containers with oxygen or other gas under pressure, where the pressure must not exceed a selected value. The use of a shielded sliding valve-operating connection, and of the curved valve head face engaging a conical seat, avoids the tendency of such valve to be blocked or interfered with by the freezing of moisture in the gas. This feature, however, is claimed in a separate application for patent by this inventor, filed April 22, 1954, Serial No. 424,957.

The fluids in both the passage and the bellows have been referred to as gases, since the illustrated embodiment includes features especially designed and advantageous for use with gas; but it should be understood that some features can be used in valves operating with liquids.

Although only one embodiment of the invention has been illustrated and described in detail, it is to be expressly understood that the invention is not limited thereto. Various changes can be made in the design, construction, relationships and arrangement of the parts without departing from the spirit and scope of the invention as the same will now be understood by those skilled in the art. In particular, while the invention includes features peculiar to fluid pressure closing valves, it also comprises certain features that may be used with other types of valve.

I claim:

1. A fluid pressure operated valve comprising a valve body having a fluid flow passage, a valve seat extending around the passage, a valve head movably engaging the seat, and means for moving the valve head to and from the seat to open and close the valve, including a closing spring bearing against one side of the valve head, an opening member movable into engagement with the other side of the valve head, a bearing in the body in which the member is slidably mounted, a bellows surrounding the member and having an inlet for pressure fluid at one end, a head extending across and sealing the other end of the bellows and engaging the member, said head having an axial cylindrical recess, a helical compression spring in the recess bearing against said head, and means for varying the valve-closing pressure of the bellows, including a longitudinally adjustable connection between said head and member.

2. A fluid pressure operated valve comprising a valve body having a fluid flow passage, a valve seat extending around the passage, a valve head movably engaging the seat and including the guide stem, and means for moving the valve head to open and close the seat, including a closing spring bearing against one side of the valve head, an opening member movable into engagement with the other side of the valve head and including a guide opening in which said guide stem is disposed, a bearing in the body in which the member is slidably mounted, a bellows surrounding and connected at one end to the member, a passage in the body for pressure fluid connected to the interior of the bellows, a valve opening spring located externally of the bellows bearing against the member in opposition to the closing spring, means for adjusting the valve opening pressure of the bellows, comprising a longitudinally adjustable connection between the head and member, and means for independently adjusting the pressure of the opening spring.

References Cited in the file of this patent

UNITED STATES PATENTS

| | | |
|---|---|---|
| 762,767 | Scott | June 14, 1904 |
| 999,329 | Mehring | Aug. 1, 1911 |
| 1,120,713 | Hennessy | Dec. 15, 1914 |
| 1,956,264 | Anderson | Apr. 24, 1934 |
| 2,111,230 | Toussaint | Mar. 15, 1938 |
| 2,158,436 | Shaw | May 16, 1939 |
| 2,209,216 | Wile | July 23, 1940 |
| 2,335,935 | Hanley | Dec. 7, 1943 |
| 2,631,832 | Heiger | Mar. 17, 1953 |
| 2,663,500 | Holtzclaw | Dec. 22, 1953 |

FOREIGN PATENTS

| | | |
|---|---|---|
| 162,542 | Switzerland | Sept. 1, 1933 |
| 1,086,776 | France | Aug. 18, 1954 |